(12) United States Patent
Cheng et al.

(10) Patent No.: US 8,656,157 B2
(45) Date of Patent: Feb. 18, 2014

(54) METHOD FOR SENDING AND RECEIVING AN ENCRYPTED MESSAGE AND A SYSTEM THEREOF

(75) Inventors: Ping Cheng, Beijing (CN); Yu Lin, Beijing (CN); Shihong Zou, Beijing (CN); Linlin Gong, Beijing (CN)

(73) Assignee: Netqin Mobile (Beijing) Co., Ltd., Beijing (CN)

( * ) Notice: Subject to any disclaimer, the term of this patent is extended or adjusted under 35 U.S.C. 154(b) by 79 days.

(21) Appl. No.: 13/482,791

(22) Filed: May 29, 2012

(65) Prior Publication Data

US 2012/0311325 A1  Dec. 6, 2012

(30) Foreign Application Priority Data

May 30, 2011  (CN) .......................... 2011 1 0142017

(51) Int. Cl.
*H04L 29/06*    (2006.01)
(52) U.S. Cl.
USPC .............. 713/162; 713/163; 726/26; 726/27; 726/28; 726/29; 726/30

(58) Field of Classification Search
USPC ........................................................ 713/162
See application file for complete search history.

(56) References Cited

U.S. PATENT DOCUMENTS

2006/0195687 A1*  8/2006  Klein et al. ................... 713/150

* cited by examiner

*Primary Examiner* — Longbit Chai
(74) *Attorney, Agent, or Firm* — Baker & McKenzie LLP

(57) ABSTRACT

The present disclosure is directed to a method for sending and receiving an encrypted message and a system thereof. The method includes steps of encrypting a message, transforming the encrypted message into network address, sending the network address to a receiver, and accessing a server according to the network address by the receiver, and a server decrypting the message, presenting the decrypted message to the receiver, and thereafter preventing the message from being accessed. Advantages include that any mobile phone capable of connection to a wireless network can read an encrypted message without installation of a decryption software on a mobile phone of a receiver.

10 Claims, 4 Drawing Sheets

METHOD FOR SENDING AND RECEIVING AN ENCRYPTED MESSAGE AND A SYSTEM THEREOF

FIELD OF THE INVENTION

The invention relates to communication security field and in particular, to a method for sending and receiving an encrypted message and a system thereof.

BACKGROUND OF THE INVENTION

As a personal message carrier, mobile device takes more responsibilities for protecting confidentiality. Data sent by a mobile device, for example short message on a mobile phone, becomes main method for personal communication, and therefore more requirements are needed for protecting confidentiality of short message on a mobile phone. On the one hand, a short message received by a user is stored on hardware of a mobile phone of a message receiving side, and if it is not deleted in time, user's privacy will be given away in case that the mobile phone is lost. On the other hand, although the mobile phone short message is sent in the form of carrier data after being compiled and modulated by mobile phone hardware, the compilation and modulation of the short message has become a standard and well-known process in the industry. Therefore by appropriate technical method, any person can intercept the short message being sent and recover the same to the short message.

In the prior art, there are many methods for protecting security of a short message. For example, the application with application No. CN101867660, filed on Jul. 6, 2010, named a method for automatic deleting a short message, discloses a technology of protecting confidentiality of a short message with which a sender adds an auto-deleted identifier in the short message and the receiver automatically deletes an already-read short message after reading the auto-deleted identifier. However, the technology requires the mobile phone on the receiver to have the function of automatic deletion for identifying the auto-deleted identifier and executing the auto-deletion.

Another application with application No 200610035193.X, filed on Jun. 20, 2007, named a short message transferring method and an apparatus thereof, discloses a method for requesting for and conforming deletion of a short message. With this method, after a user who receives a short message deletes short message of a short message deleting report having been requested for, a receiver automatically feedbacks a message of the short message deleting report to a sender, and therefore informs the sender that the short message receiver has deleted the short message having been sent, through the short message deleting report, and thus the method provides an evidence for the short message sender and enables a content provider to do statistic according to the short message deleting report. The method deletes a received short message manually while confirms the deletion with the short message-deleting report technically, and therefore there still exists great risks in security leak in case that the receiver does not delete the short message manually.

In sum, the prior art can not send and receive an encrypted message completely by technical method, or the technical method used thereof requires both the sender and receiver to install a specific client program, which limits applications on the technology.

SUMMARY OF THE INVENTION

The technical problem solved by the invention is to avoid trouble for a receiver to install a specific software and to enable any mobile phone capable of connection to a wireless network to read an encrypted message by providing a method for sending and receiving an encrypted message and a system thereof.

According to one aspect of the invention, the technical solution applied provides a method for sending and receiving an encrypted message, comprising steps of encrypting a message, further transforming the encrypted message into a network address, sending the network address to a receiver; a server decrypting the message and presenting the decrypted message to the receiver and thereafter preventing the message from being accessed.

According to one aspect of the invention, the transforming the encrypted message into a network address comprises steps of adding a protocol type, host name and path in front of the encrypted message, and appending a random code, addressing bit or parity bit to the end of the encrypted message.

According to one aspect of the invention, the method further comprises that the receiver can access to the server through the network address.

According to one aspect of the invention, the server decrypting the message and presenting the decrypted message to the receiver comprises that the server recovers the received network address to the original message and displays the original message in a webpage corresponding to the network address.

According to one aspect of the invention, the server dynamically creates a webpage comprising a sender id, content of the message and browse status thereof.

According to one aspect of the invention, the browse status of content of the message comprises Read and Unread, and content of the message is forbidden to access after the webpage created by the server has been accessed.

According to one aspect of the invention, the method further comprises that length of the message capable of being encrypted is pre-defined, and in case that number of characters being contained in the message is larger than the pre-defined message length, the message is divided into two or more segments, each message segment is encrypted, each encrypted message segment is further transformed as a network address, all network addresses are sent to the receiver and the server decrypts the message corresponding to the all network addresses and presents the decrypted message to the receiver and prevents the message from being accessed.

According to one aspect of the invention, the technical solution applied provides a system of sending and receiving an encrypted message, comprising at least one client and at least one server;

the client further comprises a message encrypting module, a message transforming module and a message sending module;

the message encrypting module being configured to receive a message input by a mobile device user and encrypt the message;

the message transforming module being configured to communicating with the message encrypting module, and receive the encrypted message from the message encrypting module and transform the encrypted message into a network address;

the message sending module being configured to communicate with the message transforming module, and read the network address and send the network address to a receiver; and the server being configured to decrypt the encrypted message, for presenting the decrypted message to the receiver and thereafter deleting the message from being accessed.

According to one aspect of the invention, the message transforming module is applied for adding a protocol type, host name and path in front of the encrypted message and for appending addressing bit or parity bit to the end of the encrypted message.

According to one aspect of the invention, the receiver can access the server by the network address and the server creates a webpage corresponding to the network address.

Advantage of the invention is to prevent a person who maliciously interrupts a message from obtaining the message by sending an encrypted message and further to enable any mobile phone capable of connection to a wireless network to read an encrypted message without installing a specific software by a receiver.

BRIEF DESCRIPTION OF THE DRAWINGS

The invention is further set forth in accompany with the flow charts below.

DETAILED DESCRIPTION OF THE INVENTION

Figure 1:
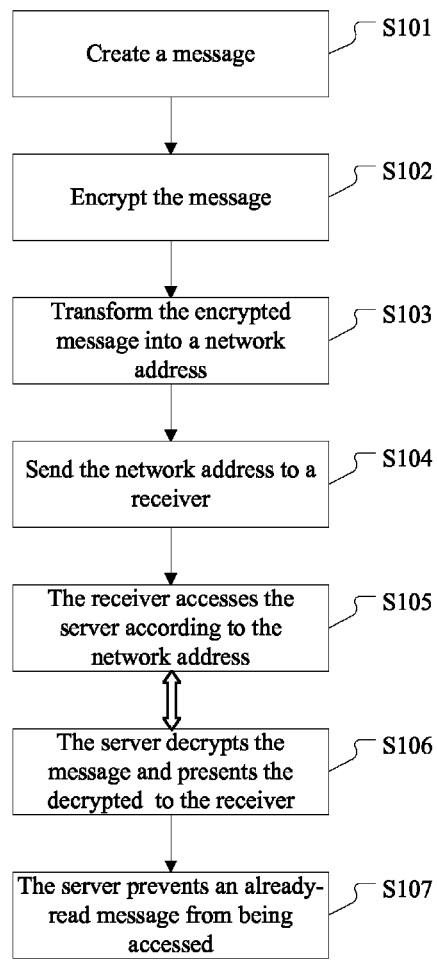
FIG. 1 is an operational flow chart of sending and receiving an encrypted message provided by the invention.
Figure 2:
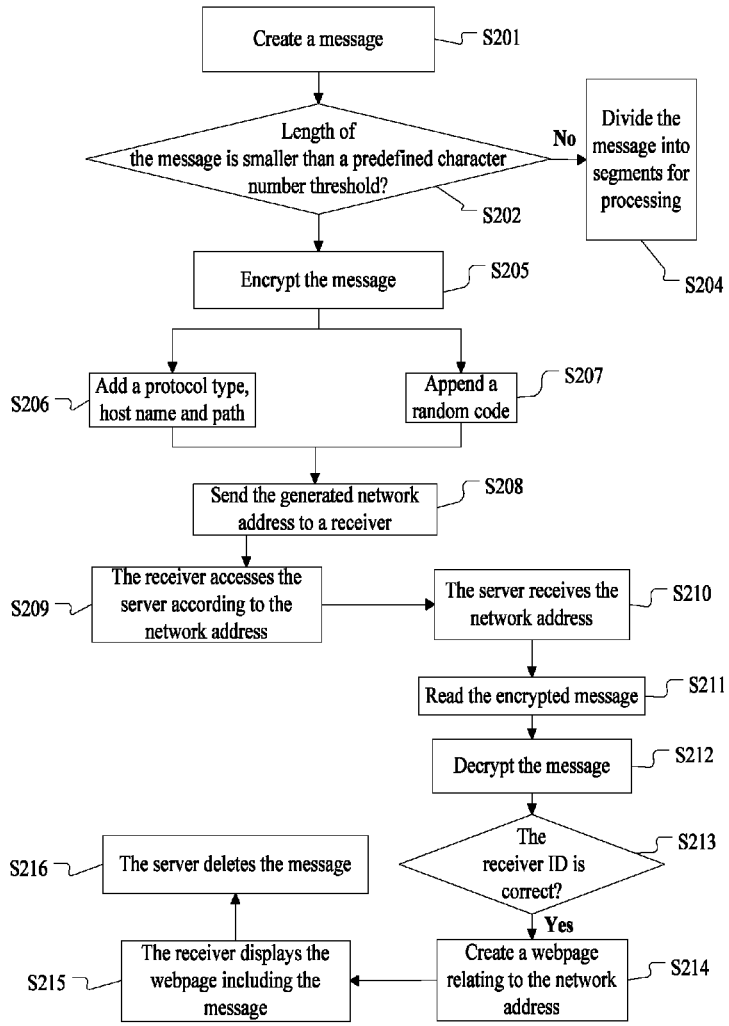
FIG. 2 is a flow chart of operational scheme of encrypting and decrypting a message provided by the invention.

The invention provides a method for sending and receiving an encrypted message and a system thereof, which enables any mobile phone capable of connection to a wireless network to read an encrypted message without installing a specific software by a receiver.

According to one embodiment of the invention, a method for sending and receiving an encrypted message is illustrated in flow chart 1. In step S101, a message is created by inputting a message by a user. In step S102, the message is encrypted.

According to one embodiment of the invention, the encrypted message is sent in the form of short message. Due to shortcoming in short message technology, number of characters contained in a short message can not be larger than 140 English characters or 70 Chinese characters, and thus the short message in excess of the above limitation needs to be segmented.

In consideration of capacity preserved for protocol type, host name, path and parity bit, length threshold of the message should be a value obtained by 140 English characters or 70 Chinese characters minus the corresponding capacity occupied by protocol type, host name, path and parity bit.

If length of the message is larger than the pre-defined character number threshold, in step S204, the message is divided into segments for processing, while if length of the message is smaller than the predefined character number threshold, the message input by the user is transformed into ASCII codes according to GB2312 standard. And in the following step S205, the ASCII codes corresponding to the message are encrypted.

According to one embodiment of the invention, the encryption can be completed with DES algorithm, also named America data encryption standard, symmetric encryption algorithm developed by America IBM Corp. in 1972. The DES algorithm uses a 56-bit key, groups a plain text by 64 bits and forms encrypted groups by operation such as replacement or exchange in term of bit, on the plain text groups and the 56-bit key.

According to one embodiment of the invention, other encryption algorithm with a 128-bit key, such as IDEA (International Data Encryption Algorithm) also can be used by the invention. A person in the art should appreciate that the invention is not limited to the above encryption algorithm, other encryption algorithms also can serve for purpose of the invention.

According to one embodiment of the invention, the ASCII code can be encrypted in the form of password book by presetting a password reference table. In case of encryption, each two or more characters are transformed into a password by a table lookup program, and correspondingly in case of decryption, the decryption can be completed by reverse lookup table. Moreover, encryption with a password book is completed without grouping by 64-bit or a 128-bit and without compensation, and therefore saves capacity of the encrypted message.

In step S103, a network address is obtained by transforming the encrypted message. According to one embodiment of the invention, as shown in step S206, a protocol type, host name and path are added in front of the encrypted message. In step S207, a random code, addressing bit or parity bit are appended to the end of the encrypted message. For example, the encrypted message is a string of 65 5e a6 28 cf 62 58 5f and the new string is http://www.xxxx.cn/En_SMS/655ea628cf62585f after adding a protocol type, host name and path in front of it.

Following the adding, a random code is appended to the end of the new string. According to one embodiment of the invention, the random code refers to time for encrypting the message. For example, the below content to be encrypted includes phone number 1, content A, time for encrypting the message of 14:00 on Jan. 1, 2001, and the encrypted code of C8F8ACGLVGAJGWLDXW8CDFIJM.

According to principle of the invention, other form of random code also can be used for ensuring a different random code to be obtained by a same message in different time or from different sender in order to identify different message.

According to one embodiment of the invention, phone numbers from the sender and the receiver are added in front of the message.

In step S104, the network address is sent to the receiver. According to one embodiment, the encrypted message is sent in the form of multi-media message. The multi-media message can send a message in length of 1200 Chinese characters each time and thus it is affected less by message length.

According to one embodiment of the invention, the encrypted message is sent in the form of short message. In step S208, the one or more network addresses are sent to the receiver in the form of a short message one by one.

In step S105, the receiver accesses the server according to the network address. According to one embodiment of the invention, in step S209, the mobile device, for example a smart phone, can automatically identify words including protocol type for example http://, or a general network address for example www., as a network address. For example with a Sybian operation system, a user on a receiving side clicks on the network address, automatically starts an internet explorer program and through which accesses online resources, such as a webpage, relating to the network address.

In step S106, the server decrypts the short message and presents the decrypted message to the receiver. According to one embodiment of the invention, in step S210, the server receives the network address from the message receiving module. In step S211, the server reads the encrypted message and the short message sending client and the network server pre-define starting byte of the encrypted message. In step S212, the server decrypts the message by using a same key with the key in the message sender, recovers the decrypted ASCII codes to Chinese characters according to GB2312 standard character table and extracts phone number of the sender and phone number of the receiver, sending time and the message, included in the decrypted message. In step S213, the server authenticates identity of the receiver according to the extracted phone number of the receiver. If identity of the requesting side who submits the network linkage is not identical to the identity of the receiver, the server refuses to provide the decrypted message, or otherwise the method goes to the next step.

According to one embodiment of the invention, in step S215, the server displays Chinese characters corresponding to the message in the created webpage by displaying textual content in the form of textbox or image.

According to one embodiment of the invention, the server presents the corresponding webpage to the receiver when the receiver accesses the related network address of the server.

In step S107, the server prevents the message from being accessed. According to one embodiment of the invention, in step S216, after the receiver accesses the network address, the server sets browse status of content of the message to be Read and prevents any further access. Optionally, the server deletes the corresponding webpage and content thereof or replaces content of the webpage with a prompt dialog box, such as The encrypted message has been deleted!.

Figure 3:
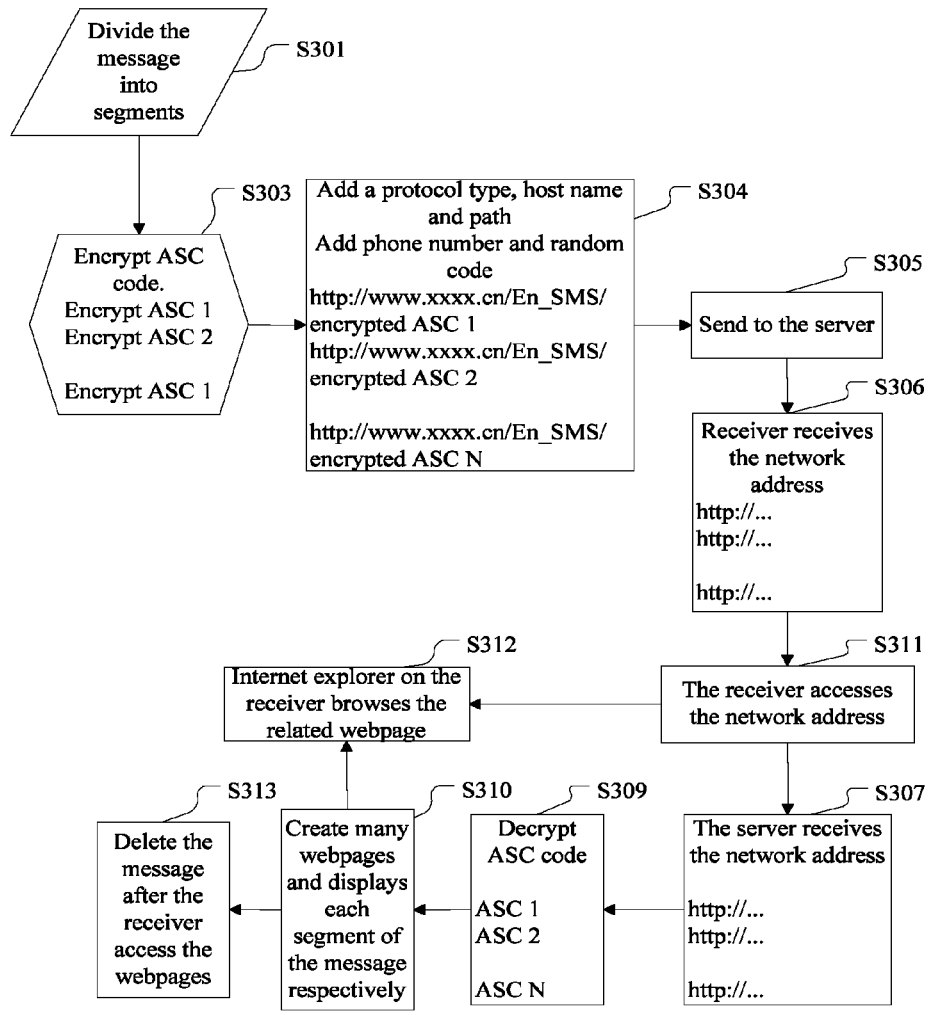
FIG. 3 is a flow chart of operational scheme of encrypting and decrypting a message larger than predefined length provided the invention.

According to one embodiment of the invention, if the short message is larger than the predefined character number threshold in length, as illustrated in FIG. 3, in step S301, the short message is divided into segments for processing. In step S303, ASCII codes corresponding to the short message segments are encrypted respectively. In step S304, a protocol type, host name and path are added in front of each segment of the encrypted ASCII codes, and a random code is appended to the end of each segment of the encrypted ASCII codes, and then more network addresses are created. In step S305, each network address created is sent to the server and the receiver respectively.

In step S306, the receiver receives each short message containing the network address. In step S307, the server receives each network address. In step S309, the server extracts the encrypted ASCII codes from each network address and decrypts the same. In step S310, each segment of ASCII codes are recovered to characters of the short message, and more web pages are created, each of which relates to one of the network addresses and displays each short message segment. In step S311, the receiver accesses the network address. In step S312, an internet explorer on the receiver browses the related web pages. In step S313, after the receiver accesses the network address, the server prevents the short message from being accessed.

Figure 4:
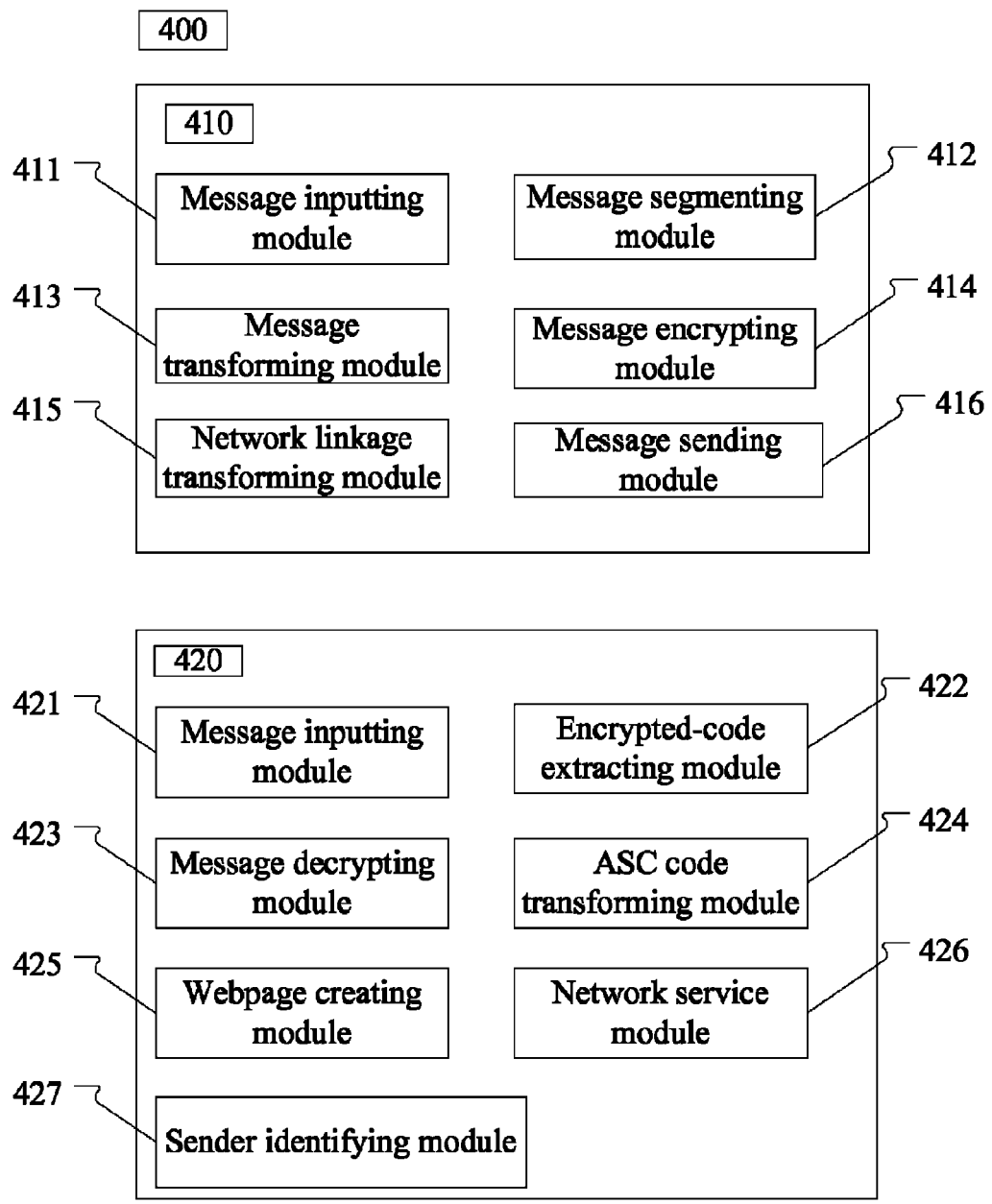
FIG. 4 is a system diagram applying the method for encrypting and decrypting a message provided by the invention.

According to one embodiment of the invention, a system 400 of implementing method of the invention is illustrated in FIG. 4. The system 400 of sending and receiving an encrypted message includes a sending client 410 and a server 420. The sending client includes a message inputting module 411, a message segmenting module 412, a message transforming module 413, a message encrypting module 414, a network linkage transforming module 415 and a message sending module 416.

The message inputting module 411 can receive an input by a user, and the user can input a message in the form of text. The message segmenting module 412 communicates with the message inputting module and is applied for receiving the message input by the user.

The message segmenting module 412 determines whether the message needs to be segmented according to a predefined maximum character number threshold. If the message is larger than the threshold in length, the message segmenting module 412 divides the message into segments. The message transforming module 413 communicates with the message segmenting module 412 and is applied for receiving the message or the divided message segments.

The message transforming module 413 transforms characters of the message into ASCII codes. The message encrypting module 114 communicates with the message transforming module 413 and is applied for receiving ASCII codes transformed by the message transforming module 413 and for encrypting the ASCII codes.

The network linkage transforming module 415 communicates with the message encrypting module 414, and is applied for receiving the encrypted string, for adding a protocol type, host name, path, phone number of the sender and phone number of the receiver in front of the string, for appending a random code to the end of the string and for creating network addresses. The message sending module 416 communicates with the network linkage transforming module and is applied for receiving and sending the network linkage to the message receiver.

The server 420 includes a message inputting module 421, an encrypted-code extracting module 422, a message decrypting module 423, an ASCII code transforming module 424, a webpage creating module 425 and a network service module 426. The message inputting module 421 is applied for receiving a request for accessing a network linkage from the client. The encrypted-code extracting module 422 communicates with the message inputting module 421 and is applied for receiving the network address and for extracting the encrypted codes from the network address.

The message decrypting module 423 communicates with the encrypted-code extracting module 422 and is applied for receiving the extracted encrypted-code and decrypting the same. The ASCII code transforming module 424 communicates with the message decrypting module 423 and is applied for receiving the decrypted ASCII codes and for converting the same into characters of the message.

The webpage creating module 425 communicates with the message inputting module 421 and the ASCII code transforming module 424, is applied for receiving a network linkage from the message inputting module 421 and for receiving characters of the message from the ASCII code transforming module 424. The webpage created by the webpage creating module 424 includes the message and the created webpage points to a linkage received by the message inputting module. The network service module 426 communicates with the message receiver, is applied for providing the webpage created by the webpage creating module 424 according to request from the message receiver and for preventing the message from being accessed after the message receiver completes the access.

According to one embodiment of the invention, the server 420 further includes a sender identifying module 427. The sender identifying module 427 communicates with the message decrypting module 423, is applied for extracting the receiver id, for example a phone number of the receiver and for comparing the extracted phone number of the receiver to the phone number of the requesting side who submits the network linkage, and if a match is found, for starting the ASCII code transforming module 424, or else if a match is not found, for starting the webpage creating module 424 and prompting a failure in identifying the side who requests for browsing the message.

For setting forth purpose of the invention, it is impossible to describe each combination of systems or methods, but a person in the art should appreciate that there are more combinations and modifications of the invention. Therefore, the invention is intended to include more modifications, changes and substitutions of this type. For example, the invention is not limited to sending and receiving a text message, other form of message, such as a multi-media message, can also realize the purpose of sending and receiving an encrypted message according to method of the invention. Further, although one specific feature of the invention is disclosed by one of the above embodiments, it can also be combined with other features in other embodiments of the invention.

What is claimed is:

1. A method for sending and receiving an encrypted message, wherein the method comprising the steps of:
   encrypting a message by a client device,
   transforming the encrypted message into a network address of a server, sending the network address to a receiver from said client device, and
   the server decrypting the message, presenting the decrypted message to the receiver when said receiver accesses a webpage corresponding to the network address of the server and thereafter preventing the message from being accessed.

2. The method of claim 1, wherein the transforming the encrypted message into a network address comprises:
   adding a protocol type, host name and path in front of the encrypted message and appending a random code, addressing bit or parity bit to the end of the encrypted message.

3. The method of claim 2, wherein the method further comprising
   the server being accessed through the network address by the receiver, and the receiver being authenticated by the server.

4. The method of claim 3, wherein the server decrypting the message and presenting the decrypted message to the receiver comprises:
   the received network address being recovered to the original message by the server, and
   the server displaying the original message in a webpage corresponding to the network address.

5. The method of claim 4, the method further comprising
   the server dynamically creating a webpage comprising a sender id, content of the message and browse status thereof.

6. The method of claim 5, wherein the browse status of content of the message comprises Read and Unread, and content of the message is forbidden to access after the webpage created by the server has been accessed.

7. The method of claim 1, further comprising
   length of the message capable of being encrypted being predefined,
   the message being divided into two or more segments in case that number of characters contained in the message is larger than the predefined message length,
   encrypting each message segment, transforming each encrypted message segment into a network address,
   sending all network addresses to the receiver, and decrypting the message corresponding to the all network addresses, presenting the decrypted message to the receiver and thereafter preventing the message from being accessed by the server.

8. A system of sending and receiving an encrypted message, the system comprising at least one client device and at least one server,
   the client device further comprising a message encrypting module, a message transforming module and a message sending module,
   the message encrypting module being configured to receive a message input by a mobile device user and encrypt the message at said client device;
   the message transforming module being configured to communicate with the message encrypting module, and receive the encrypted message from the message encrypting module and transform the encrypted message at said client device into a network address of the at least one server;
   the message sending module being configured to communicate with the message transforming module, and read the network address and send the network address to a receiver from said client device, and
   the server being configured to decrypt the encrypted message, presenting the decrypted message to the receiver when said receiver accesses a webpage corresponding to the network address of the server and thereafter preventing the message from being accessed.

9. The system of claim 8, wherein the message transforming module adds a protocol type, host name and path in front of the encrypted message and appends a random code, addressing bit or parity bit to the end of the encrypted message.

10. The system of claim 8, wherein the receiver can access the server through the network address and the server creates a webpage corresponding to the network address.

* * * * *